Figure 1:
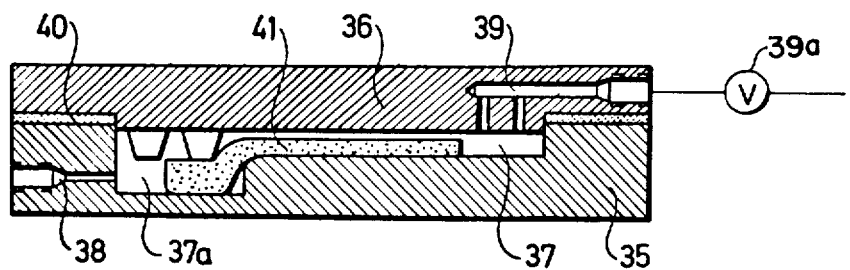

United States Patent [19]

Dinzburg et al.

[11] 4,047,860
[45] Sept. 13, 1977

[54] PRESS MOLD FOR PRODUCING MICROCELLULAR SHAPED PIECES OF DIMENSIONAL ACCURACY, PARTICULARLY SHOE SOLES

[75] Inventors: Boris Nisonovich Dinzburg; Jury Alexandrovich Smetkin; Vladimir Iosifovich Alexeenko; Vsevolod Andreevich Mikhailov, all of Moscow, U.S.S.R.; Ivan Lorant, Budapest, Hungary; Gyozo Seltenreich, Dunakeszi, Hungary; Jeno Keszei, Budapest, Hungary; Gyorgy Marton, Budapest, Hungary; Albert Balazsfai, Budapest, Hungary; Jeno Donath, Budapest, Hungary; Erno Bolcskei, Budapest, Hungary

[73] Assignees: Bor-, Cipo-, Szormeipari Kutato Intezet, Budapest, Hungary; Vseojuzny Nauchno-Issledovatelsky Institut Plenochnykh Materialov I Iskusstvennoi Kozhi, Moscow, U.S.S.R.

[21] Appl. No.: 553,152

[22] Filed: Feb. 26, 1975

Related U.S. Application Data

[62] Division of Ser. No. 332,089, Feb. 13, 1973, Pat. No. 3,897,190, which is a division of Ser. No. 96,738, Dec. 10, 1970, abandoned.

[30] Foreign Application Priority Data

Dec. 30, 1969 Hungary .................... BO 1210

[51] Int. Cl.$^2$ .................... B29D 27/00; B29F 1/00
[52] U.S. Cl. .................... 425/4 R; 425/129 S; 425/542; 425/812; 249/109; 249/141
[58] Field of Search .............. 425/193, 195, 812, 119, 425/129 S, 4, 812, 242, 18, 34 S, 42 H, 36, 17 S

[56] References Cited

U.S. PATENT DOCUMENTS

| 2,766,484 | 10/1956 | Sanderson | 425/812 |
| 2,803,043 | 8/1957 | Stephens | 425/812 |
| 3,160,921 | 12/1964 | Ludwig | 425/119 X |
| 3,481,003 | 12/1969 | Taylor et al. | 425/129 S X |
| 3,677,678 | 7/1972 | Christie et al. | 425/129 S X |

Primary Examiner—J. Howard Flint, Jr.
Attorney, Agent, or Firm—Young & Thompson

[57] ABSTRACT

Press molds for vulcanizing plastic materials comprise a pair of mold parts defining between them a mold cavity. One of the parts is a die and the other is a cover plate that defines with the die the mold cavity. A hot liquid is introduced into a lower portion of the mold cavity through the die and gas is removed from the upper portion of the mold cavity through the cover plate. As a result, both prevulcanization and after vulcanization can be achieved in one single press mold, by surrounding the material in the mold with hot liquid in the prevulcanization and then withdrawing the liquid when the molded material fills the die cavity in the second stage of vulcanization.

1 Claim, 2 Drawing Figures

PRESS MOLD FOR PRODUCING MICROCELLULAR SHAPED PIECES OF DIMENSIONAL ACCURACY, PARTICULARLY SHOE SOLES

This is a division, of application Ser. No. 332,089, filed Feb. 13, 1973, now U.S. Pat. No. 3,897,190, which is a divisional of Ser. No. 96,738, filed Dec. 10, 1970, now abandoned.

A great variety of porous rubbers and plastics varying from articles with totally open intercommunicating cells to articles with fully closed cells are well known in the art. In many fields, for example, in the shoe manufacturing solely expanded rubbers with fully closed cells are of importance as only these materials meet the requirements laid off shoe manufacture.

The making of expanded rubbers with closed cells, commonly called microcellular rubbers by which title they will be referred to hereinafter, involves expanding. One prior art process has been to calender the relatively soft rubber mixture into a sheet or rod stock, to place this stock in an autoclave and to fill it up with a high-pressure gas (at least 200 atm.) for example, with nitrogen, whereupon a portion of said gas dissolves under the high pressure in the rubber stock, further after vulcanization to reduce the pressure by opening the mould whereupon the gas dissolved in the rubber stock expands and produces closed cells within the stock.

A more advanced process has been to add blowing agents to the crude rubber stock intended to be vulcanized in mould and heat this mixture, whereupon the blowing agents decompose to gaseous products which dissolve partly or entirely under the high pressure.

By heating the mixture this is cross-linked (vulcanized), and by opening the mould the pressure is reduced, whereupon the gaseous products expand and produce closed cells within the stock. For blocking mould parting lines the mould has been overcharged by more than 3%.

A feature in most of the above-mentioned various processes is the use of moulds with conical splits.

In the one-stage vulcanizing process the stock begins to expand when vulcanization is terminated. A disadvantage of the process is that in practice it is difficult, if not impossible, to produce a final product, the dimensions of which — after expanding — correspond to the required dimensions. In the course of production the rubber stock grows in bulk to the multiple of its previous volume, later same goes through a shrinkage of about 3-25% which may keep on during storage. No shaped pieces of dimensional accuracy having an apparent density less than 0.7 g/cm³ may be produced by any one of these processes only less accurate ones having an apparent density of 0.7 - 0.9 g/cm³.

In most cases two or multistage vulcanization processes are employed for producing microcellular shaped pieces which processes comprise a prevulcanization stage (temporary cross-linking) and one or more subsequent vulcanization stages (curing). It is in the nature of the multistage techniques that the microcellular structure produced by expansion in the relatively plastic stock during the prevulcanization stage has to be stabilised by a final vulcanization.

One of the known two-stage processes of the art has been to achieve the first vulcanization stage in mould and to perform the second, or subsequent stages in or outside the mould. In this way there may be obtained microcellular sheets or shaped pieces of apparent density of 0.3 - 0.7 g/cm³. Although the extent of shrinkage of these products is less than that of shaped pieces made by the one-stage process, as the extent of the strains arising during expansion is also less, it is a disadvantage of this method that it is difficult, if not impossible, to ensure a dimensional accuracy to the shaped pieces as the extent of the contraction cannot be controlled.

A known two-stage method has been to add blowing agents which decompose at a higher temperature than the vulcanization temperature to the rubber stock, and in the first stage to vulcanize the stock 15 minutes at a temperature of 110° C whereupon the stock grows in bulk to the manifold of its original volume, then to cure the intermediate product obtained in a closed mould in the usual way.

Since the first vulcanization stage is carried out free, without applying pressure a disadvantage of this method is that the cells of the final product are large-sized, that is to say, the product has no microcellular structure hence it follows that its strength properties are worse than the properties of products having a microcellular structure. By means of this method no shaped piece of good quality and of dimensional accuracy having embossed pattern and the dimensions of the parts of which varies from place to place within same piece may be produced.

Another prior art process has been to employ press mould including plungers built into the mould, to fill up completely the mould with the stock and to vulcanize the stock under a determined specific pressure in the usual way and not to open the mould after the prevulcanization is complete but to release the plunger which is pressed upwards by the pressure of the gas to a determined extent which is the intended height of the shaped piece, hence it follows that the stock expands only in one direction. The complete vulcanization is achieved at a temperature equal to the prevulcanization temperature.

It is a disadvantage of this process that the stock expands only in one direction and owing to this fact there may be obtained only such shaped pieces of inhomogeneous structure, in which the thick walled cells of various sizes are unevenly dispersed. Neither this process allows of producing embossed shaped pieces of low apparent density and of dimensional accuracy and the thickness of parts of which varies within same shape.

Present-day known press tools have many inherent deficiencies, for example a disadvantage of all known press tools is that heating up can be achieved only by the aid of heated plates, this layout partly adversely increases heating time cycles, partly does not provide uniform cross-linking in the stock if its parts are of various thickness, further owing to the great thermal energy loss this layout is uneconomical.

It is an object of the present invention to provide an efficient press tool for producing microcellular shaped pieces of dimensional accuracy and of low apparent density (less than 0.7 g/cm³) in any form and embossed with any pattern at will and the thickness of which varies within same piece and the cells of which are of the same size, and having high strength properties and complying with standard specifications and not shrinking during storage and which are suited to be fastened by vulcanization to other shaped parts, e.g. to shoe upper parts.

The invention comprises a press tool for performing a process for the manufacture of microcellular shaped pieces described above which comprises compounding a stock containing an elastomer, a plastomer the melting temperature of which is equal to or less than the temperature of the first vulconization stage, and/or a thermoplastic elastomer, a blowing agent, the decomposition temperature of which in the particular stock is equal to or less than the temperature of the first vulcanization stage, an accelerator system which induces fast cross-linking in the first vulcanization stage and together with the vulcanization temperature and vulcanization time provides a minimum rate of vulcanization in the 20 - 70% cross-linking range, and usual compounding ingredients used in the rubber industry, e.g. plasticizers and fillers; further vulcanizing and partially cross-linking said stock in a closed mould under pressure at a temperature and for a time determined by the accelerator system, in the first vulcanization stage, expanding the prevulcanized stock then completely vulcanizing the prevulcanized, expanded semi-product, cut to measures in particular cases, in a closed mould the form and dimensions of which are equal to the form and dimensions of the final product under pressure and at temperature determined by the composition of the stock in question in the second and/or subsequent vulcanization stages; further cooling the completely vulcanized product under pressure in a closed mould thereby hardening the plastomer component and stabilizing the final product in a form which corresponds to the form of the closed mould in the final vulcanization stage.

In certain cases it is expedient to modify the volume of the press tool between the first and second vulcanization stage.

A characteristic feature of the invention is that the pressure required to prevulcanization of the crude stock is provided in the closed mould the form and dimensions of which are equal to the form and dimensions of the final product by the pressure of a liquid conducted into said mould where said liquid surrounds the stock to be vulcanized, further that the expanding of the prevulcanized stock is achieved through reducing the pressure by way of discharging said liquid whereby the prevulcanized stock fills completely in the closed mould, further that the prevulcanized stock is vulcanized completely in the second vulcanization stage.

According to the present invention for pressing medium hot liquid is used in the prevulcanization stage whereby both the pressure and the temperature required to the vulcanization are simultaneously provided.

Another characteristic feature of the invention is that the shaped piece, for example shoe sole, cross-linked to some extent in the first vulcanization stage, is simultaneously attached by way of a second and/or subsequent vulcanization stages to another shaped piece or pieces made of some structural material, for example: metal, plastics, rubber, leather, for example to shoe upper part. This attaching may be carried out by spreading thermoplastic cement over the recepting pieces and joining up the cemented piece to the prevulcanized shaped piece and stabilizing this bond by a second vulcanization stage. Choice of a suitable adhesive is, of course, dependent on the particular material in question.

The means for performing the process of this invention has many advantages which other known processes of the art do not dispose of.

By the aid of the means for performing the process of present invention it has become possible for the first time to eliminate the phenomenon of postexpansion respectively postshrinkage in the production of vulcanized microcellular products, as a result of which in the second vulcanization stage there are provided shaped pieces of high dimensional accuracy and of a desirable low apparent density (0.2 - 0.7 g/cm$^3$) having uniformly distributed cells and the strength properties of which comply with every requirement of the practice. Those shaped pieces may be attached by vulcanization to other structural pieces, for example shoe soles to shoe upper parts, but as a matter of course these microcellular shaped pieces of various configuration may be attached also to structural pieces made of metal, plastics, etc. There is no loss of material when processing, as the cutting waste left over in the clicking procedure which follows the first vulcanization stage may be reprocessed. The moulds suitable for use in the practice of this invention are constructionally simple, not too expensive, and are easily handled.

The invention will be more clearly understood by reference to following Examples which are pure illustrative. Table 1. illustrates some suitable crude stock mixtures.

Table No. 1.

| Constituents | Formulation of compounds (Parts by weight) | | | |
|---|---|---|---|---|
| | 1 | 2 | 3 | 4 |
| Elastomers natural rubber | 20.0 | 20.0 | 40.0 | 25.0 |
| synthetic rubber (styrene-butadiene rubber) | 40.0 | 40.0 | 24.0 | — |
| Plastomer: polyethylene | 20.0 | 30.0 | 20.0 | 75.0 |
| Rubber resin: Butakon S 8551 | 20.0 | 10.0 | 16.0 | — |
| Expanding agent: dinitroso-pentamethylene-tetraamin | 3.7 | 4.0 | 3.0 | 3.0 |
| Accelerator system mercaptobenzothiazole (Captax) | 1.4 | 1.4 | 1.4 | 1.4 |
| diphenyl-guanidine (Denax) | 0.7 | 0.7 | 0.7 | 0.7 |
| Sulfur | 2.7 | 2.7 | 2.7 | 2.7 |
| Usual rubber ingredients (filler, plasticizer, etc.) | 50.0 | 50.0 | 50.0 | 20.0 |

The choice of materials for compounding is not, of course, confined to materials enumerated in Table 1., all those materials may be eligible which comply with the stipulations referred to above, that is to say: accelerator systems which induce fast cross-linking — as to function of time and temperature — in the first vulcanization stage and provide a minimum rate of vulcanization in the 20 - 70% cross-linking range; blowing agents the decomposition temperature of which in the particular stock is equal to or less than the temperature of the first vulcanization stage; plastomers the melting temperature of which is equal to or less than the temperature of the first vulcanization stage. In this way for elastomer instead of synthetic styrene-butadiene rubber following may be employed: acrylinitrile rubber, polychloroprene, polybutadiene, polyisoprene, etc. For plastomer, for example, polystyrene or PVC may be used instead of polyethylene. The plastomer-elastomer mixture may be substituted by or mixed with all other thermoplastic elastomers. For rubber resin instead of "Butakon S 8551" of high styrene content indicated in Table 1 other rubber resins, may be considered. For blowing agent in place of the indicated dinitroso-pentamethylenetetramine also azodicarbonamide or benzenesulphydrazine, etc. may be employed. For accelerator system as a rule guanidine derivatives and amine accelerators, benzthiazole derivatives or all these jointly may be used. Further streamlined division of Ser. No. 332,089 examples are disclosed in U.S. Pat. No. 3,003,192.

The components of the stock partly exert an influence over the properties of the final product partly determine to a certain extent the parameters of the vulcanization time, temperature and pressure, accordingly the choice may range between wide limits depending both on the materials applied and the mixing ratio further on the parameters of vulcanization. Table 2. indicates the vulcanization parameters relating to mixtures indicated in Table 1. and mixtures No. 5, 6, containing cuttings too, further some of the strength properties characteristic of the final product. In respect of basic materials mixtures No. 5., 6. correspond to mixtures No. 1–4.

120–135° C. The closed mould must provide a uniform heating up of the same extent in every part of the crude shaped piece. It is inexpedient to exceed the temperature of 145° C, in the first vulcanization stage — considering the postulate relating to vulcanizing at a minimum of temperature. The length of time of the prevulcanization stage is 5–35 minutes, preferably 10–20 minutes (see Table 2.) depending on the applied vulcanization temperature. In this stage the stock becomes only partially cross-linked while the blowing agent completely decomposes to gaseous products. The prevulcanized intermediate products are expanded free or in the mould itself.

After this procedure the prevulcanized expanded intermediate product gets into the second stage of vulcanization where it is put into a mould the form and dimensions of which are equal to the form and dimen- Table No. 2

| Parameters of Vulcanisation and indices of strength properties | Unit | Stock (no cuttings) | | | | Stock Containing Cuttings | |
|---|---|---|---|---|---|---|---|
| | | 1 | 2 | 3 | 4 | 5 | 6 |
| Time of cross-linking of the first vulcanization stage | minute | 10 | 10 | 10 | 10 | 10 | 20 |
| Temperature of cross-linking of the first vulcanization stage | °C | 130 | 130 | 130 | 130 | 130 | 120 |
| Time of cross-linking of the second vulcanization stage (after vulcanization) | minute | 10 | 10 | 10 | 10 | 10 | 10 |
| Temperature of cross-linking of the second vulcanization stage (after vulcanization) | °C | 160 | 160 | 160 | 160 | 160 | 160 |
| Tensile strength before aging | kp/cm$^2$ | 38 | 46 | 40 | — | 38 | 39 |
| Tensile strength after aging | kp/cm$^2$ | 46 | 39 | 36 | — | 34 | 38 |
| Elongation at break before aging | % | 225 | 312 | 255 | — | 284 | 327 |
| Elongation at break after aging | % | 245 | 208 | 223 | — | 256 | 270 |
| Permanent elongation (at elongation of 30%) | % | 4.5 | 3.0 | 4.0 | — | 4.0 | 4.0 |
| Permanent deformation (under pressure/2 h, 50%, 25° C) | % | 5.8 | 4.7 | 5.4 | — | 4.5 | 4.8 |
| Tear propagation | kp/cm | 5.7 | 6.2 | 6.5 | — | 5.4 | 4.9 |
| Softness | — | 76 | 78 | 75 | — | 70 | 83 |
| Shrinkage at 25° C after 100 days | % | 0.5 | 0.5 | 0.5 | — | 0.5 | 0.5 |
| Shrinkage at 70° C in 8 hours | % | 2.7 | 2.3 | 2.3 | 2.2 | 2.5 | |
| Apparent density | g/cm$^3$ | 0.4 | 0.39 | 0.4 | 0.38 | 0.4 | |
| Bending strength | kilocycles | 25 | more than 25 | 25 | 25 | 25 | |

After mixing of the stock is complete- for example achieved according to formulae indicated above and by usual rubber techniques, it is expedient to perform the preceeding mixing-up of the elastomer and the plastomer at the melting temperature of the thermoplast - the stock is calandered on a profile calander or extruded through a profile orifice to sheets. This procedure is followed by the first stage of vulcanization. After vulcanization it is required that the degree of cross-linking of the intermediate product be minimal and of the same value in all parts of various thickness. Only observance of this condition provides a suitable reshapeability, a uniform microcellular structure and the reprocessability of the outtings. Therefore the first vulcanization stage has to be achieved at the lowest temperature possible. This procedure occurs in closed space, expediently in closed mould under pressure that is higher than 2 kg/cm$^2$ preferably under a plunger pressure of, for example 40–60 kg/cm$^2$ and in case of mixtures indicated in Table 1. at a temperature of 60–160° C, preferably at sions of the final product, and where the cross-linking of the stock is completed — in the case of mixtures according to Table 1. This procedure is carried out in 5–10 minutes under a pressure of 5–35 kg/cm$^2$, preferably of 20 kg/cm$^2$, at a temperature that is higher than the prevulcanization temperature, at about 120–200° C, preferably at 160° C. The parameters of pressure, temperature and time — as corresponding parameters — of the first vulcanization stage may of course come up to different values in case of other mixtures.

At the end of the second vulcanization stage prior to reducing pressure, that is to say, prior to opening the press tool, the vulcanized microcellular product is expediently cooled down to room temperature, the press will be opened only after cooling is complete, then the shaped piece is removed from it. The plastomer being in the stock becomes hard on the effect of cooling and stabilizes the shaped piece. The final product, the form and dimensions of which are equal in every direction to the form and dimensions of the vulcanizing interior of the press mould undergoes no expension, consequently no shrinkage any more. As a result of the process shaped microcellular pieces of dimensional accuracy and of low apparent density may be obtained. Namely the developed gas products expand the prevulcanized stock and the second vulcanization stage, to which the high temperature and pressure required to develop final shape is at the same time provided by way of the simultaneously expanding gas, stabilizes the expanded structure. In the cooling stage the gas pressure in the cells decreases and the thermoplastic components (plastomers) strengthen and stabilize the cell walls. As a result of it no subsequent dimensional change in the shaped microcellular piece will any longer take place and the piece retains its shape, for example, like plaster casting.

Further advantages of the present invention are that — owing to the technique described above — any embossed pattern may be accomplished on the surface of the shaped piece simultaneously with the vulcanizing procedure and that the cuttings derived from clicking may be reused omitting the usual reclaiming process without any falling-off in quality. Clicking is carried out namely after the first vulcanization stage when the cross-linking has not yet been completed. The cuttings may be reused without further ado for basic component of the stock.

The vulcanization of the basic stock containing basically same components may be achieved very advantageously by the process described above according to which the basic stock the dimensions of which are smaller than the dimensions of the press tool cavity, is subjected to a hydraulic pressure and the indication of heat quantity required to the vulcanization is achieved expediently by the pressing medium itself. For this purpose the use of highly pressurized hot water seems to be the most obvious solution. This process is achieved, among others, on the same parameters indicated above and in the same way and the indices of the product obtained in this way are of the same value.

Figure 2:
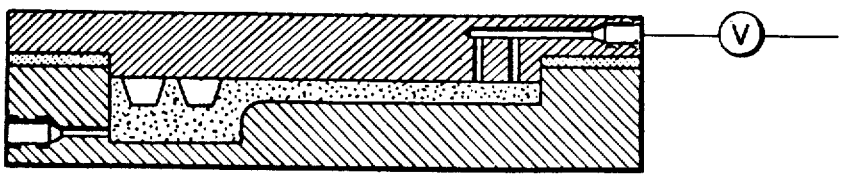

The press tool suitable for use in the process according to the invention is illustrated in the accompanying drawing from which also further advantages of the invention will appear, where FIG. 1 is a cross-sectional view of a press mold according to the invention, by which both prevulcanization and after vulcanization are achieved in a single mold; and FIG. 2 is a view similar to FIG. 1 but showing the second stage of vulcanization.

FIGS. 1 and 2 represent a press tool by the aid of which the periodicity of the working operation may be eliminated, that is to say, both prevulcanization and aftervulcanization are achieved in one single press mould and not in two templates. This is very advantageous because the numerous working operations of the process carried out in two templates: change of the press tool, the placing in and taking out of the material, encumber and extend the production, provide opportunity for loosening workshop discipline and falling off in quality and productivity.

The press tool represented in FIGS. 1 and 2 consists of a die 35 and a cover 36. The channel 38 formed in the body of the die 35 opens into the lower part of the shaping space 37a of the die 37 and through which a liquid employed for pressing and heat transmitting medium, for example water, may be conducted. Another channel 39 formed in the cover 36 opens into the upper part of the moulding space 37. This channel 39 serves for evacuating the air driven out by the flowing-in liquid from the moulding space 37. The channels 38, 39 are fitted out with a closing device in order that the liquid may flow out of the press tool at termination of the first stage of vulcanization. The required pressure of the liquid is provided by a pump — not represented in the figure.

The vulcanization by the aid of the press tool described above is carried out as follows:

The crude product of small volume 41 is placed into the moulding space 37 and the die 35 is closed by the cover 36. The press tool is placed on the heating plate of the press and is pressed together at required pressure by the aid of the press. Liquid (water) is conducted through the channel 38 into the moulding space 37 and after filling up the moulding space by liquid the air evacuating channel 39 is closed down by closing valve 39a, thereupon the pressure and temperature of the tool is increased to an extent required by the first stage of vulcanization.

At the end of the first stage of vulcanization the liquid is discharged from the moulding space 37 of the press mould whereupon the crude stock expands and its in every direction growing volume fills completely the moulding space 37 of the press tool which space accurately corresponds to the form of the required product (see position in conformity with FIG. 1.)

Then the second stage of vulcanization is carried out. The temperature required for this is provided by the known heatable press plate — not represented in the figure — on which the press tool is placed.

On completion of the second stage of vulcanization the press mould is cooled down and the end product is taken out of it.

As mentioned above the whole vulcanization operation has been carried out in the very same press tool and no need for additional manipulation has appeared.

What we claim is:

1. A press tool for vulcanizing plastic material, comprising a die, a cover plate forming with said die a molding chamber, said die having a flat bottom surface and said cover plate having a flat upper surface parallel to said bottom surface of said die, said die and cover plate having upright edges extending between said upper and lower surfaces, means for introducing a hot liquid through a said edge of said die into a lower portion of said chamber, and means to remove gas from an upper portion of the chamber through a said edge of said cover plate.

* * * * *